United States Patent
Kojima

(10) Patent No.: US 10,461,667 B2
(45) Date of Patent: Oct. 29, 2019

(54) VIBRATION ACTUATOR AND ELECTRONIC APPARATUS USING VIBRATION ACTUATOR

(71) Applicant: CANON KABUSHIKI KAISHA, Tokyo (JP)

(72) Inventor: Nobuyuki Kojima, Machida (JP)

(73) Assignee: Canon Kabushiki kaisha, Tokyo (JP)

( * ) Notice: Subject to any disclaimer, the term of this patent is extended or adjusted under 35 U.S.C. 154(b) by 357 days.

(21) Appl. No.: 15/484,538

(22) Filed: Apr. 11, 2017

(65) Prior Publication Data
US 2017/0310245 A1    Oct. 26, 2017

(30) Foreign Application Priority Data
Apr. 25, 2016   (JP) ................................ 2016-087072

(51) Int. Cl.
*H02N 2/00* (2006.01)
*H02N 2/02* (2006.01)
*H02N 2/10* (2006.01)

(52) U.S. Cl.
CPC .......... *H02N 2/001* (2013.01); *H02N 2/0055* (2013.01); *H02N 2/026* (2013.01); *H02N 2/103* (2013.01)

(58) Field of Classification Search
CPC ...... H02N 2/001; H02N 2/0055; H02N 2/026; H02N 2/103
See application file for complete search history.

(56) References Cited

U.S. PATENT DOCUMENTS

| | | | | |
|---|---|---|---|---|
| 5,982,075 A * | 11/1999 | Hayasaka | ............... | H02N 2/004 310/12.01 |
| 5,986,383 A * | 11/1999 | Hasuda | .................. | H02N 2/004 310/317 |
| 6,380,660 B1 | 4/2002 | Maeno et al. | | |
| 6,404,104 B1 | 6/2002 | Maeno et al. | | |
| 6,819,029 B2 | 11/2004 | Ohno et al. | | |
| 8,643,252 B2 | 2/2014 | Oda et al. | | |
| 8,760,036 B2 * | 6/2014 | Kojima | ................ | H02N 2/0015 310/323.01 |

(Continued)

FOREIGN PATENT DOCUMENTS

JP    2015-043668 A    3/2015

OTHER PUBLICATIONS

U.S. Appl. No. 15/389,750, Nobuyuki Kojima, filed Dec. 23, 2016.

*Primary Examiner* — J. San Martin
(74) *Attorney, Agent, or Firm* — Venable LLP

(57) ABSTRACT

A vibration actuator capable of determining positional relationship between a vibration body and driven body with high accuracy while keeping a pressurized contact state therebetween. The driven body contacts with the vibration body in a first direction and moves in a second direction perpendicular to the first direction. A holding member that holds the vibration body has two holes. A support member that supports the holding member has two projections that fit in the holes to form first and second fitting parts. The projection contacts with the hole in the second direction and in a third direction perpendicular to both the first and second directions in the first fitting part. The projection contacts with the hole in the third direction in the second fitting part. A contact range of the projection and hole in the third direction in the first fitting part differs from that in the second fitting part.

9 Claims, 9 Drawing Sheets

(56) References Cited

U.S. PATENT DOCUMENTS

| | | | |
|---|---|---|---|
| 9,530,953 B2* | 12/2016 | Yokoyama | H02N 2/0015 |
| 2009/0140608 A1* | 6/2009 | Kasai | G02B 7/08 |
| | | | 310/323.16 |
| 2011/0317293 A1* | 12/2011 | Shiga | G02B 7/102 |
| | | | 359/824 |
| 2013/0278112 A1* | 10/2013 | Yokoyama | H02N 2/0015 |
| | | | 310/323.01 |
| 2015/0103424 A1* | 4/2015 | Araki | H02N 2/0015 |
| | | | 359/824 |
| 2015/0303833 A1* | 10/2015 | Kojima | H02N 2/0015 |
| | | | 310/323.16 |
| 2017/0104934 A1* | 4/2017 | Oda | G02B 27/646 |

* cited by examiner

VIBRATION ACTUATOR AND ELECTRONIC APPARATUS USING VIBRATION ACTUATOR

BACKGROUND OF THE INVENTION

Field of the Invention

The present invention relates to a vibration actuator and an electronic apparatus using the vibration actuator.

Description of the Related Art

Various types of vibration actuators using an electro-mechanical energy conversion element are known. For example, there is a known vibration actuator that includes a driven body, a vibration body that is configured by connecting a piezoelectric device to a back side of a tabular elastic body on which two driving projections are provided at a front side thereof, and a pressurizing means for bringing the two driving projections into press contact with the driven body. The vibration actuator generates an elliptic movement on front ends of the two driving projections in a plane including a direction that connects the two driving projections and a projecting direction of the driving protrusions by applying predetermined alternating voltage to the electro-mechanical energy conversion element. Accordingly, since the driven body receives friction-driving force from the two driving projections, the vibration body and driven body are relatively moved in the direction that connects the two driving projections.

It becomes important that the vibration body is held so as not to reduce vibration amplitude excited in the vibration body from viewpoints of stabilization of a drive performance of the vibration actuator and of acquisition of a high performance. Accordingly, there are various proposals about the holding mechanism for a vibration body. For example, a holding mechanism for a vibration body disclosed in Japanese Laid-Open Patent Publication (Kokai) No. 2015-43668 (JP 2015-43668A) has a holding member that holds the vibration body and a fixed member that supports the holding member. One of the holding member and fixed member has fitting projections, and the other has positioning holes into which the fitting projections are fitted. The holding member is supported by the fixed member by inserting the fitting projections into the positioning holes so as to be movable in a projecting direction of the driving projections of the vibration body. The gap between the outer circumferential surface of the fitting projection and the inner surface of the positioning hole in the direction that intersects perpendicularly with the moving direction of the driven body and intersects perpendicularly with the projecting direction of the driving projections is smaller than that in the moving direction of the driven body. This allows slight inclination of the vibration body in the driving direction of the driven body, and enables to control inclination in the direction that intersects perpendicularly with the moving direction of the driven body and intersects perpendicularly with the projecting direction of the driving projections within a predetermined range.

However, the holding mechanism of the vibration body disclosed in the above-mentioned publication needs the gap between the outer circumferential surface of the fitting projection and the inner surface of the positioning hole in the moving direction of the driven body. Accordingly, an additional configuration is needed in order to determine a relative positional relationship between the vibration body and driven body at the time of driving with high accuracy.

SUMMARY OF THE INVENTION

The present invention provides a vibration actuator that is capable of determining relative positional relationship between a vibration body and driven body with high accuracy and of keeping a pressurized contact state between the vibration body and driven body.

Accordingly, a first aspect of the present invention provides a vibration actuator including a vibration body that has an electro-mechanical energy conversion element, a driven body that contacts with the vibration body in a first direction and that relatively moves with respect to the vibration body in a second direction that intersects perpendicularly with the first direction, a holding member that holds the vibration body, and a support member that supports the holding member. One of the holding member and the support member has two projections projected in the first direction, and the other has two holes into which the two projections are respectively fitted to form a first fitting part and a second fitting part. The projection contacts with the hole at least one part in the second direction and in a third direction that intersects perpendicularly with both the first and second directions in the first fitting part. The projection contacts with the hole at least one part in the third direction in the second fitting part, and a contact range of the projection and the hole in the third direction in the first fitting part differs from that in the second fitting part.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
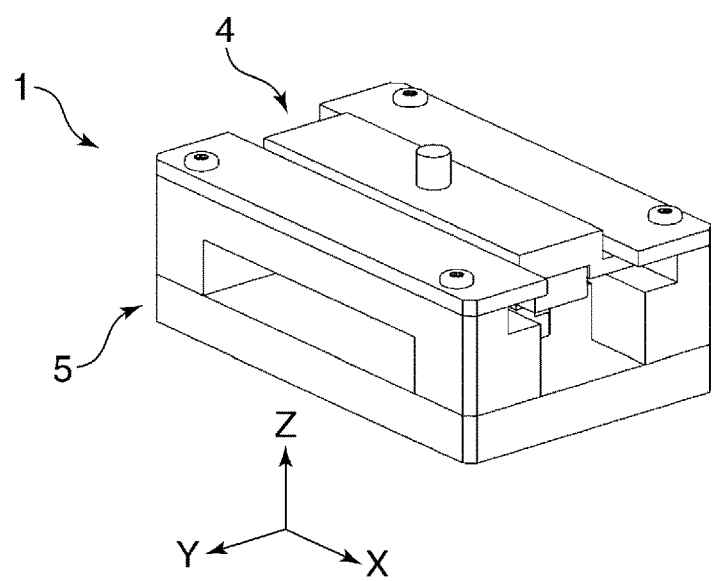
FIG. 1A and FIG. 1B are an external perspective view and a sectional view showing a vibration actuator according to a first embodiment of the present invention, respectively.
Figure 1B:
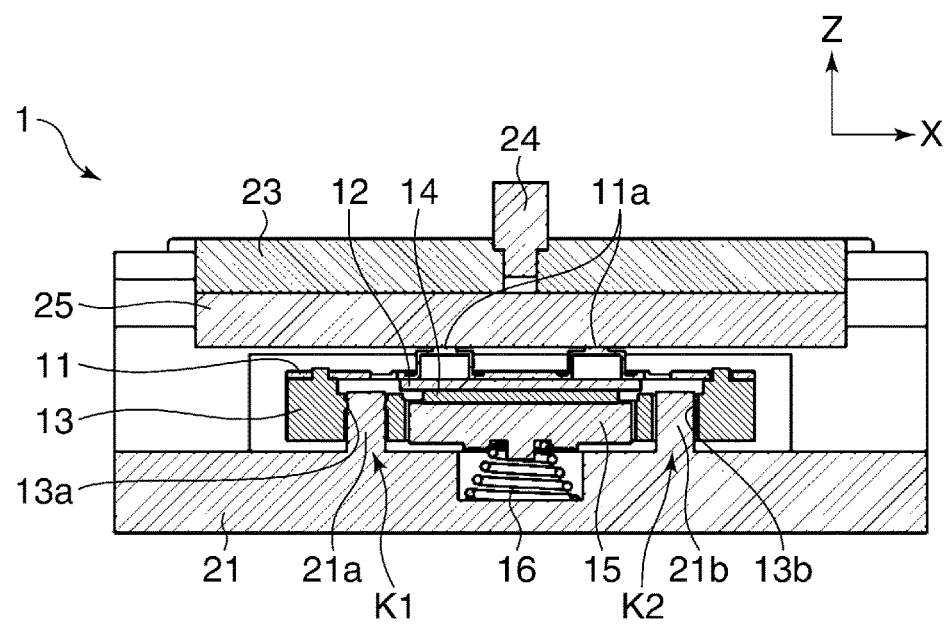
Figure 2:
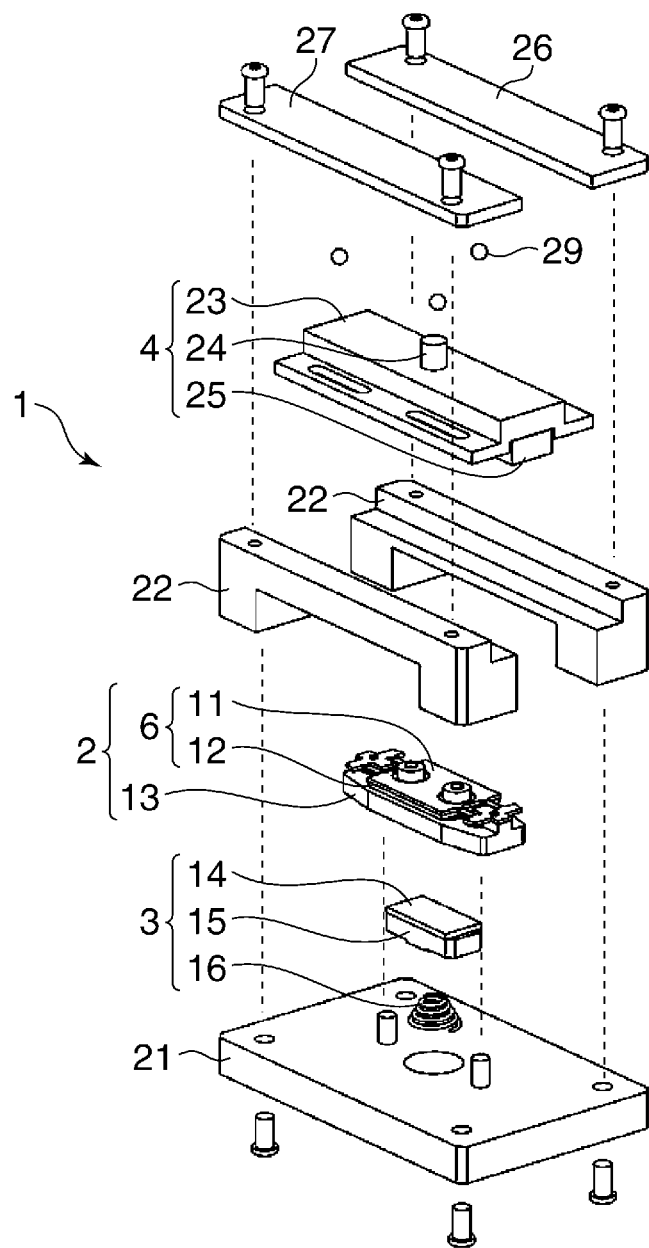
FIG. 2 is an exploded perspective view of the vibration actuator in FIG. 1A.

FIG. 1A is a perspective view schematically showing a configuration of a vibration actuator 1 according a first embodiment of the present invention, and FIG. 1B is a sectional view showing the vibration actuator 1. FIG. 2 is an exploded perspective view showing the vibration actuator 1. It should be noted that an X-axis, a Y-axis, and a Z-axis that intersect perpendicularly mutually are defined as shown in FIG. 1A for convenience of description. A Z-axis direction (first direction) is a pressurizing direction in which pressure force that brings a vibration body unit 2 into press contact with a driven body 4 functions, and is a thickness direction of the vibration actuator 1. As mentioned later, an X-axis direction (second direction) is a relative moving direction between the vibration body unit 2 and the driven body 4, and is a longitudinal direction of the vibration actuator 1. A Y-axis direction (third direction) intersects perpendicularly with both the X-axis direction and the Z-axis direction, and is a width direction of the vibration actuator 1.

The vibration actuator 1 mainly consists of the driven body 4 and a housing part 5. The driven body 4 is arranged so as to be surrounded by the housing part 5, and is linearly movable in the X-axis direction relatively to the housing part 5 as mentioned later. The driven body 4 has a driven object frame 23, an output transfer part 24, and a slide member 25. The housing part 5 has a vibration body unit 2, a pressurizing unit 3, a base 21, two support frames 22, a first rail 26, and a second rail 27. The vibration body unit 2 has a vibration body 6 and a holding member 13. The vibration body 6 has an elastic body 11 and a piezoelectric device 12. The pressurizing unit 3 has a pressurizing block 15, a shock absorber 14, and a pressurizing spring 16.

The base 21 located in the bottom of the housing part 5 is a support member that supports the vibration body unit 2 (the holding member 13), and is used as foundations of the housing part 5. The two support frames 22 are fixed to an upper surface of the base 21. The first rail 26 and the second rail 27 are fixed to upper portions of the two support frames 22, respectively. The pressurizing unit 3 is arranged at a top-center part of the base 21. In more detail, a bottomed round hole is famed in the top-center part of the base 21, and the pressure spring 16 is arranged in this bottomed round hole. The shock absorber 14 is joined to the pressurizing block 15 using adhesive etc. A concavo-convex part that fits to the upper portion of the pressure spring 16 is provided at a bottom of the pressurizing block 15. The pressurizing block 15, shock absorber 14, and vibration body unit 2 are arranged in this order on the pressure spring 16. Thus, the pressurizing spring 16 applies the pressure force that presses the vibration body unit 2 to the side of the driven body 4 (Z-axis direction) via the pressurizing block 15 and the shock absorber 14. Accordingly, the vibration body unit 2 comes into press contact with the driven body 4. It should be noted that the shock absorber 14 contacts with the vibration body 6 and reduces transmission of the vibration that occurs in the vibration body 6 to the pressurizing unit 3.

A first fitting projection 21a and a second fitting projection 21b are formed on the top surface of the base 21 as two projection parts so that the projections are apart with a predetermined gap in the X-axis direction across the bottomed round hole to which the pressurizing spring 16 is arranged. Moreover, a first fitting hole 13a and a second fitting hole 13b into which the first fitting projection 21a and the second fitting projection 21b are respectively fitted are formed in the holding member 13 holding the vibration body 6. Fitting of the first fitting projection 21a to the first fitting hole 13a constitutes a first fitting part K1, and fitting of the second fitting projection 21b to the second fitting hole 13b constitutes a second fitting part K2. The vibration body unit 2 is held by the base 21 so as to be movable in the Z-axis direction (the direction in which the pressurizing unit 3 gives the vibration body unit 2 the pressure force) by means of the first fitting part K1 and the second fitting part K2. Details of the first fitting part K1 and the second fitting part K2 will be mentioned later.

In the vibration body 6, the tabular piezoelectric device 12 as an electro-mechanical energy conversion element is joined to one surface (back surface) of the elastic body 11 using adhesive. Moreover, two driving projections 11a are provided on the side (upper surface), which is opposite to the side to which the piezoelectric device 12 is joined, of the elastic body 11 with a predetermined gap in the X-axis direction. The two driving projections 11a can be integrally formed with the elastic body 11 by press working of the plate-like elastic body 11, for example. Alternatively, the driving projections 11a may be prepared as separate parts that are fixed to the elastic body 11 by a method, such as welding. Since the pressure force by the pressure spring 16 presses the vibration body unit 2 to the driven body 4, the front ends of the two driving projections 11a contact with the bottom surface of the slide member 25. Arms are provided on the elastic body 11 at the both ends in the longitudinal direction. The vibration body 6 is supported by the holding member 13 by fixing the arms to the holding member 13.

In the driven body 4, the slide member 25 is joined to a depression formed in the center bottom of the driven object frame 23 using adhesive etc. When receiving friction driving force from the driving projections 11a of the vibration body unit 2, the slide member 25 slides with respect to the driving projections 11a. The output transfer part 24 is fixed near the center of the top surface of the driven object frame 23 by the screw clamp etc. Steel-ball guide slots are formed on the driven object frame 23 extending in the X-axis direction. One steel ball 29 (rolling element) is arranged in each of the steel-ball guide slots. Moreover, steel-ball support portions (not shown) are formed on the sides, which are opposite to the steel-ball guide slots in the Z-axis direction, of the first rail 26 and the second rail 27. The pressure force that the vibration body unit 2 receives from the pressurizing unit 3 is transferred to the driven object frame 23 through the slide member 25. Accordingly, the driven object frame 23 is pressed against the first rail 26 and the second rail 27 through the steel balls 29. Thus, the driven body 4 is held by the housing part 5 so as to be movable in the X-axis direction by rolling the steel balls 29. Accordingly, the driven body 4 is moved in the X-axis direction by exciting vibration in the vibration body 6 so that elliptic movements occur in the driving projections 11a in a Z-X plane. Since the method for exciting the vibration in the vibration body 6 by applying alternating voltage to the piezoelectric device 12 so as to generate the elliptic movements in the driving projections 11a and the configuration of the piezoelectric device 12 for this purpose are well known, detailed descriptions are omitted.

In the vibration actuator 1 constituted as mentioned above, when the posture of the vibration body unit 2 is stable, the friction driving force given from the vibration body unit 2 to the driven body 4 is stabilized. In order to stabilize the drive performance of the vibration actuator 1, it becomes important that the vibration body unit 2 maintains a proper posture to the slide member 25. Next, the method for holding the posture of the vibration body unit 2 in the vibration actuator 1 will be described.

Figure 3:
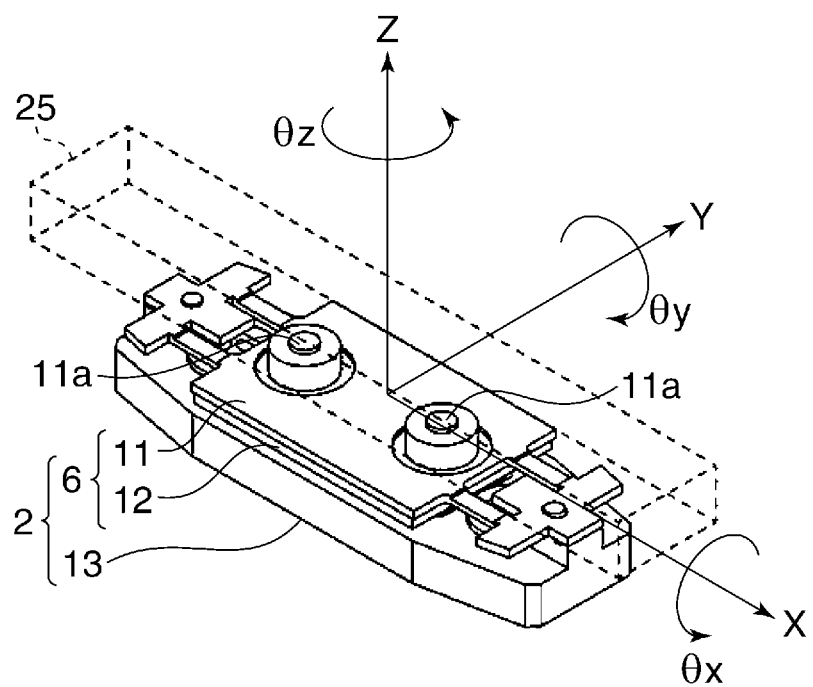
FIG. 3 is a perspective view for describing a positional relationship and postures of a vibration body unit and a slide member that constitute the vibration actuator in FIG. 1A.

FIG. 3 is a perspective view describing a positional relationship between the vibration body unit 2 and the slide member 25 and the postures thereof. In FIG. 3, the slide member 25 is indicated by broken lines. Rotative directions θx, θy, and θz shown in FIG. 2 respectively indicate rotative directions around the X-axis, Y-axis, and Z-axis of the vibration body unit 2. When the driven body 4 is driven in the X-axis direction, the reaction force (reaction force of the friction driving force that is given to the slide member 25 from the driving projections 11a) of the driving acts on the vibration body unit 2 in the X-axis direction. Accordingly, it is preferable that the moving amount of the vibration body unit 2 in the X-axis direction by the reaction force be small in order to drive the driven body 4 in the X-axis direction so as to position (stop) the driven body at a target position with high accuracy.

Moreover, the movement of the vibration body unit 2 in the Y-axis direction needs to be regulated so that the contact between the vibration body unit 2 and the slide member 25 is maintained. Furthermore, the vibration body unit 2 needs to be held so as to be movable to the base 21 in the Z-axis direction in order to transfer the pressure force received from the pressurizing unit 3 to the slide member 25. In this case, the rotation (displacement in the rotative direction θx) of the vibration body unit 2 around the X-axis needs to be regulated so that the transmission efficiency of the friction driving force from the driving projections 11a to the slide member 25 is not lowered. On the other hand, the vibration body unit 2 needs certain degrees of freedom around the Y-axis (rotative direction θy) so as to slide with respect to the slide member 25 when the elliptic oscillations are excited in the driving projections 11a. Then, since it is preferable that the friction driving force that occurs in the vibration body 6 coincide the driving direction of the slide member 25, rotation around the Z-axis (displacement in the rotative direction θz) needs to be regulated.

Figure 4A:
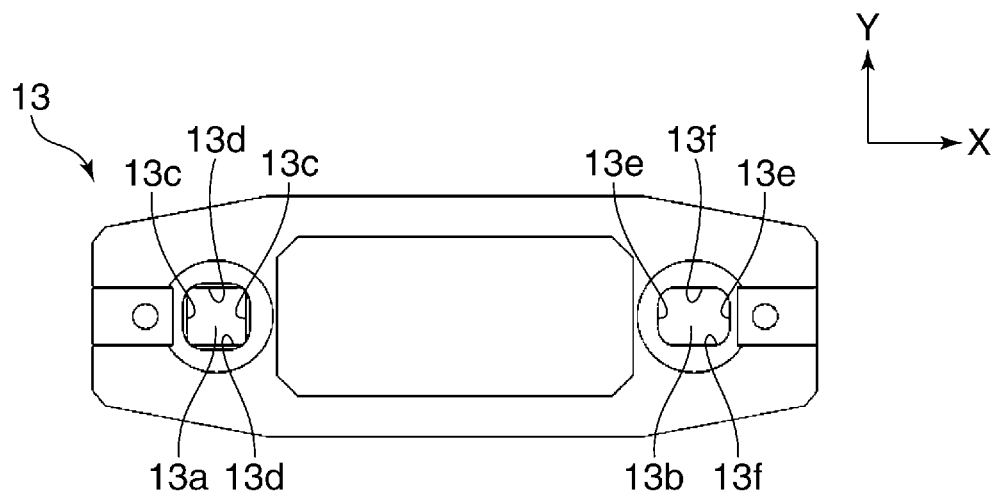
FIG. 4A and FIG. 4B are a plan view and a perspective view including a partial cross section showing a holding member that constitutes the vibration body unit in FIG. 3, respectively.
Figure 4B:
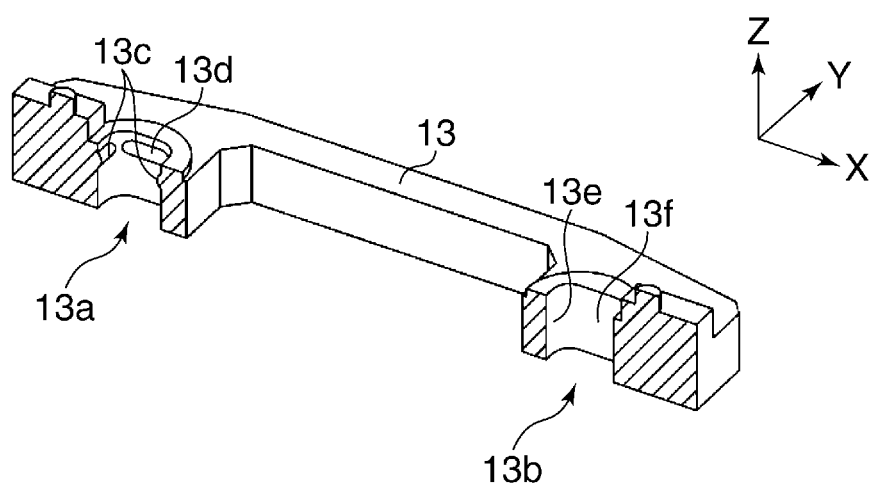

The configuration of the holding member 13 for holding the posture of the vibration body unit 2 so as to satisfy these conditions will be described. FIG. 4A is a plan view of the holding member 13, and FIG. 4B is a perspective view including a partial cross section of the holding member 13. In the holding member 13, the first fitting hole 13a and the second fitting hole 13b are formed with a predetermined gap in the X-axis direction. Each of the first fitting hole 13a and the second fitting hole 13b is symmetrical about both of the Y-axis direction and the X-axis direction.

The first fitting hole 13a is a rectangular hole of which a plane shape (it is a shape viewed in the Z-axis direction, and will be used in the same meaning in the following description) is approximately square that has rounded corners. Convex parts 13c that are short in the Z-axis direction and are long in the Y-axis direction are formed on two side surfaces of the first fitting hole 13a in the X-axis direction (side surfaces that intersect perpendicularly with the X-axis). Moreover, convex parts 13d that are short in the Z-axis direction and are long in the X-axis direction are formed on two side surfaces of the first fitting hole 13a in the Y-axis direction (side surfaces that intersect perpendicularly with the Y-axis). The second fitting hole 13b is a rectangular hole of which a plane shape is approximately rectangle that has rounded corners. The second fitting hole 13b is formed so that the long side meets the X-axis direction. The two side surfaces of the second fitting hole 13b in the X-axis direction function as separation parts 13e that do not contact with the second fitting projection 21b simultaneously. The two side surfaces of the second fitting hole 13b in the Y-axis direction function as contact parts 13f that contact with the outer circumferential surface of the second fitting projection 21b.

Figure 5A:
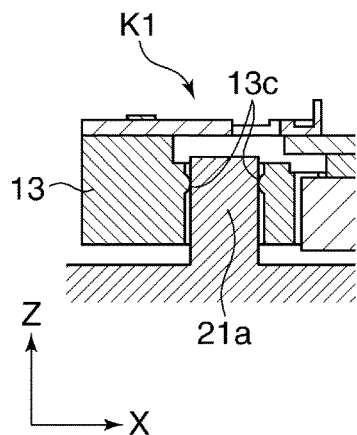
FIG. 5A, FIG. 5B, FIG. 5C, and FIG. 5D are sectional views showing configurations of a first fitting part and a second fitting part provided in the vibration actuator in FIG. 1A.
Figure 5C:
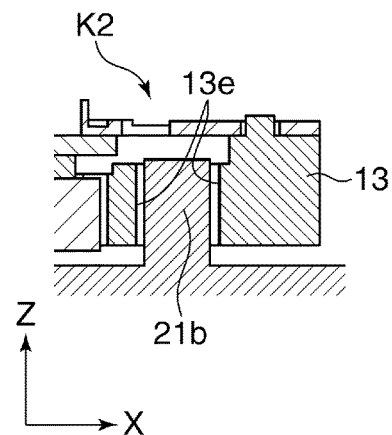
Figure 5B:
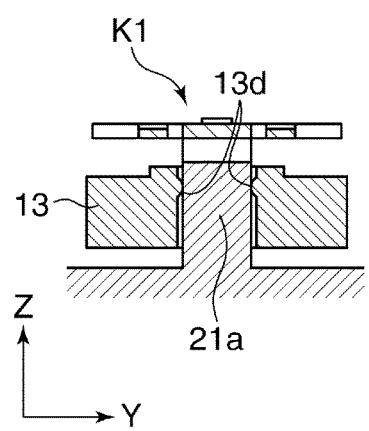
Figure 5D:
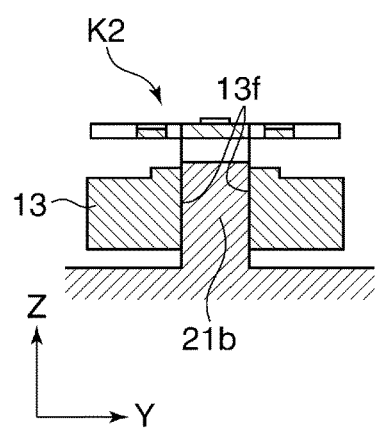

Next, the functions of the first fitting part K1 and the second fitting part K2 including the functions of the convex parts 13c and 13d, the separation parts 13e, and the contact parts 13f will be described. FIG. 5A, FIG. 5B, FIG. 5C, and FIG. 5D are sectional views showing the configurations of the first fitting part K1 and the second fitting part K2. FIG. 5A is a Z-X sectional view of the vicinity of the first fitting part K1, and FIG. 5B is an Y-Z sectional view of the vicinity of the first fitting part K1. FIG. 5C is a Z-X sectional view of the vicinity of the second fitting part K2, and FIG. 5D is an Y-Z sectional view of the vicinity of the second fitting part K2. It should be noted that the first fitting projection 21a and the second fitting projection 21b have cylindrical shapes of which plane shapes are approximately circular (see FIG. 2). Moreover, FIG. 5A, FIG. 5B, FIG. 5C, and FIG. 5D are shown as sections including center axes of the first fitting projection 21a and the second fitting projection 21b.

As shown in FIG. 5A, the first fitting projection 21a in the first fitting part K1 contacts with ridge lines (top portions) of the two convex parts 13c formed in the first fitting hole 13a in the X-axis direction. The minimum distance between the two convex parts 13c (distance between the ridgelines) in the X-axis direction is designed so as to be slightly larger than the outer diameter of the first fitting projection 21a. For example, the first fitting projection 21a and the convex parts 13c are formed so that the gap between the outside of the first fitting projection 21a and the convex parts 13c becomes 10 μm through 15 μm. Accordingly, the movement of the vibration body unit 2 in the X-axis direction is regulated by the fitting of the two convex parts 13c and the first fitting projection 21a. On the other hand, the rotation of the vibration body unit 2 around the Y-axis is not regulated in the first fitting part K1 by narrowing the contact range of the two convex parts 13c in the Z-axis direction.

As shown in FIG. 5B, the first fitting projection 21a in the first fitting part K1 contacts with ridge lines of the two convex parts 13d formed in the first fitting hole 13a in the Y-axis direction. The gap between the two convex parts 13d (distance between the ridgelines) in the X-axis direction is designed so as to be slightly larger than the outer diameter of the first fitting projection 21a. For example, the first fitting projection 21a and the convex parts 13d are famed so that the gap between the outside of the first fitting projection 21a and the convex parts 13d becomes 10 μm through 15 μm. Accordingly, the movement of the vibration body unit 2 in the Y-axis direction is regulated by the fitting of the two convex parts 13d and the first fitting projection 21a.

As shown in FIG. 5C, there is a gap of about 0.2 mm, for example, between the separation parts 13e, which are the side surfaces of the second fitting hole 13b in the X-axis direction, and the outer circumferential surface of the second fitting projection 21b in the second fitting part K2. Accordingly, the rotation of the vibration body unit 2 around the Y-axis is not regulated. On the other hand, the movement of the vibration body unit 2 in the X-axis direction is regulated by the first fitting part K1. Moreover, if the movement of the vibration body unit 2 in the X-axis direction is regulated in the second fitting part K2, the vibration body unit 2 may be regulated more than needed because the movement is regulated by both the first fitting part K1 and the second fitting part K2. Accordingly, the second fitting part K2 does not regulate the movement of the vibration body unit 2 in the X-axis direction.

As shown in FIG. 5D, there is a gap of about 10 μm through 15 μm between the outer circumferential surface of the second fitting projection 21b and the contact parts 13f that are the side surfaces of the second fitting hole 13b in the Y-axis direction in the second fitting part K2 so that the outer circumferential surface of the second fitting projection 21b contacts with the contact parts 13f. The fitting of the contact parts 13f and the second fitting projection 21b regulates the rotation of the vibration body unit 2 around the X-axis within the range of the gap between the outer circumferential surface of the second fitting projection 21b and the contact parts 13f. For example, when length of each contact part 13f in the Z-axis direction is 1 mm, the rotatable angle around the X-axis is regulated within a range of ±0.9 degrees.

Since the convex parts 13d are apart from the contact parts 13f in the X-axis direction, their energization functions regulate the rotation of the vibration body unit 2 around the Z-axis. Moreover, the movement of the vibration body unit 2 in the Y-axis direction is regulated by not only the convex parts 13d but also the contact parts 13f. When the vibration body unit 2 is held by the above-mentioned configuration, the vibration body unit 2 keeps a satisfactory contact state to the slide member 25 in the rotative directions θx, θy, and θz. This stabilizes the drive performance of the vibration actuator 1.

As mentioned above, the vibration actuator 1 is configured so that at least a part of the first fitting hole 13a contacts with the first fitting projection 21a in the X-axis direction and the Y-axis direction in the first fitting part K1. Moreover, at least a part of the second fitting hole 13b contacts with the second fitting projection 21b in the Y-axis direction in the second fitting part K2. In that case, the vibration body unit 2 is held stably by shifting the contact range of the fitting hole and fitting projection in the Y-axis direction in the first fitting part K1 away from that in the second fitting part K2. Accordingly, other configurations of the first fitting part K1 and the second fitting part K2 will be described as follows.

Figure 6:
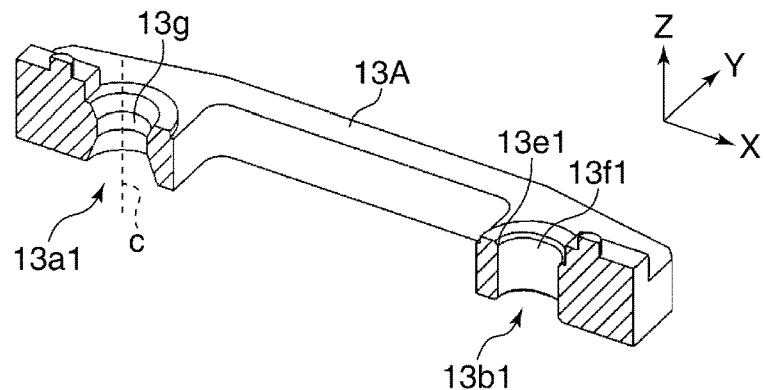
FIG. 6 is a perspective view including a partial cross section of another configuration example of the holding member that constitutes the vibration body unit in FIG. 3.

FIG. 6 is a perspective view including a partial cross section schematically showing a configuration of a holding member 13A that is another configuration example of the holding member 13. The holding member 13A has a first fitting hole 13a1 into which the first fitting projection 21a fits and a second fitting hole 13b1 into which the second fitting projection 21b fits. The first fitting hole 13a1 is formed so that a plane shape is approximately circular, i.e., is formed as an approximately circular hole around a center axis c indicated by a broken line. The diameter of the first fitting hole 13a1 at the center part in the Z-axis direction is shorter than the diameter at an end in the Z-axis direction. Accordingly, a convex part 13g that projects inwardly is formed in the first fitting hole 13a1 at the center part in the Z-axis direction. There is a gap of about 10 μm through 15 μm between the outer circumferential surface of the first fitting projection 21a and the ridge line of the convex part 13g so that the outer circumferential surface of the first fitting projection 21a contacts with the ridgeline of the convex part 13g. The convex part 13g faces the convex parts 13c and 13d formed in the first fitting hole 13a of the holding member 13. The first fitting hole 13a1 that has the convex part 13g exhibits the same function as the first fitting hole 13a of the holding member 13.

The plane shape of the second fitting hole 13b1 is an approximate oval of which the major axis is in the X-axis direction and the minor axis is in the Y-axis direction. There is a gap of about 0.2 mm between the side surface of the second fitting hole 13b1 and the outer circumferential surface of the second fitting projection 21b in the X-axis direction. On the other hand, there is a gap of about 10 μm through 15 μm between the side surface of the second fitting hole 13b1 and the outer circumferential surface of the second fitting projection 21b, and the outer circumferential surface of the second fitting projection 21b contacts with the side surface of the second fitting hole 13b1. That is, the side surfaces of the second fitting hole 13b1 in the X-axis direction and Y-axis direction respectively correspond to the separation parts 13e and the contact parts 13f of the second fitting hole 13b of the holding member 13. And the second fitting hole 13b1 exhibits the same function as the second fitting hole 13b of the holding member 13. Accordingly, the combination of the base 21 and the holding member 13A has the same effect as the supporting mechanism of the vibration body unit 2 by the combination of the base 21 and the holding member 13. It should be noted that the plane shape of the second fitting hole 13b1 may be an approximate ellipse. In such a case, the second fitting hole 13b1 should be arranged so that the major axis is in the X-axis direction.

Figure 7:
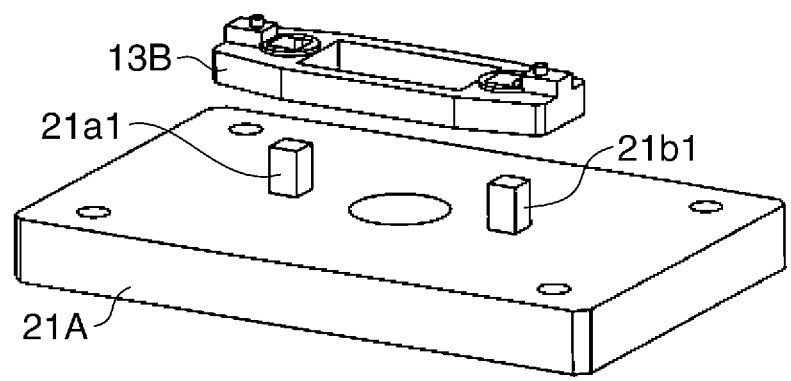
FIG. 7 is a perspective view showing a configuration of another base that constitutes the vibration actuator in FIG. 1A.

FIG. 7 is a perspective view schematically showing a configuration of a base 21A that is another configuration example of the base 21. The base 21A is provided with a first fitting projection 21a1 and a second fitting projection 21b1 that respectively fit to the first fitting hole 13a and the second fitting hole 13b that are formed in the holding member 13. The holding member 13B shown in FIG. 7 is mentioned later with reference to FIG. 8.

Both the first fitting projection 21a1 and the second fitting projection 21b1 have square pole forms and plane shapes are an approximate squares. It is designed so that the length of one side of the squares is approximately equal to the diameter of the cylindrical first fitting projection 21a. Accordingly, the fitting state of the first fitting projection 21a1 and the first fitting hole 13a becomes the same as the fitting state of the first fitting projection 21a and the first fitting hole 13a described with reference to FIG. 5A and FIG. 5B. Moreover, the fitting state of the second fitting projection 21b1 and the second fitting hole 13b becomes the same as the fitting state of the second fitting projection 21b and the second fitting hole 13b described with reference to FIG. 5C and FIG. 5D. Accordingly, the supporting mechanism for the holding member 13 with the combination of the base 21A and the holding member 13 also has the same effect as the supporting mechanism for the holding member 13 with the combination of the base 21 and the holding member 13.

Figure 8:
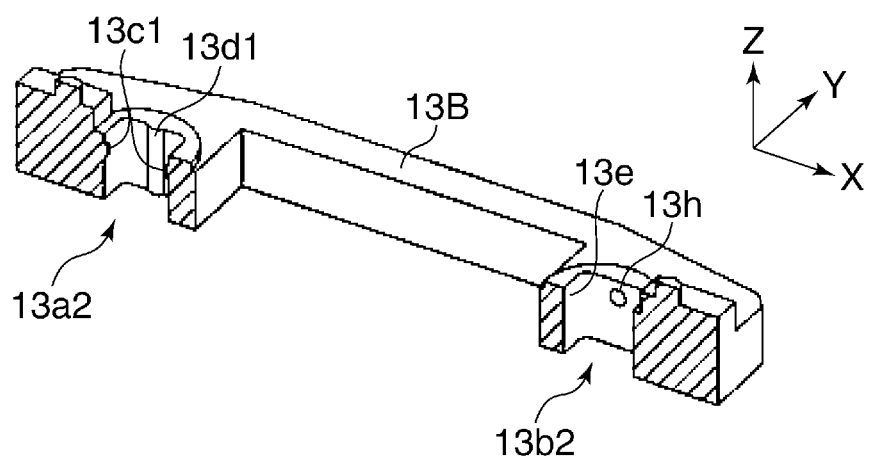
FIG. 8 is a perspective view including a partial cross section schematically showing a configuration of a holding member used in combination with the base in FIG. 7.

FIG. 8 is a perspective view including a partial cross section schematically showing a configuration of a holding member 13B used in combination with the base 21A. The holding member 13B has a first fitting hole 13a2 into which the first fitting projection 21a1 fits and a second fitting hole 13b2 into which the second fitting projection 21b1 fits. Each of the first fitting hole 13a2 and the second fitting hole 13b2 is approximately symmetrical about both the X-axis direction and the Y-axis direction.

The plane shape of the first fitting hole 13a2 is a square that has rounded corners Convex parts 13c1 having convex shapes are respectively formed on the two side surfaces of the first fitting hole 13a2 in the X-axis direction. Moreover, convex parts 13d1 that are short in the X-axis direction and are long in the Z-axis direction are formed on two side surfaces of the first fitting hole 13a2 in the Y-axis direction. The rotation of the vibration body unit around the X-axis using the holding member 13B is regulated by the contact of the convex part 13d1 and the first fitting projection 21a1 within a range of their gap (for example, 10 μm through 15 μm). Although the convex parts 13c1 regulate the movement of the vibration body unit 2 in the X-axis direction, it does not regulate the rotation around the Y-axis.

A plane shape of the second fitting hole 13b2 is a rectangle that has rounded corners. The second fitting hole 13b2 is formed so that the long side meets the X-axis direction. The two side surfaces of the second fitting hole 13b2 in the X-axis direction function as the separation parts 13e. Dot-shaped convex parts 13h are respectively formed on the two side surfaces of the second fitting hole 13b2 in the Y-axis direction. The movement of the vibration body unit 2 in the Y-axis direction when the second fitting hole 13b2 and the second fitting projection 21b1 are fitted is regulated by the convex parts 13h. In this way, the supporting mechanism for the holding member 13B with the combination of the base 21A and the holding member 13B also has the same effect as the supporting mechanism for the holding member 13 with the combination of the base 21 and the holding member 13.

Figure 9A:
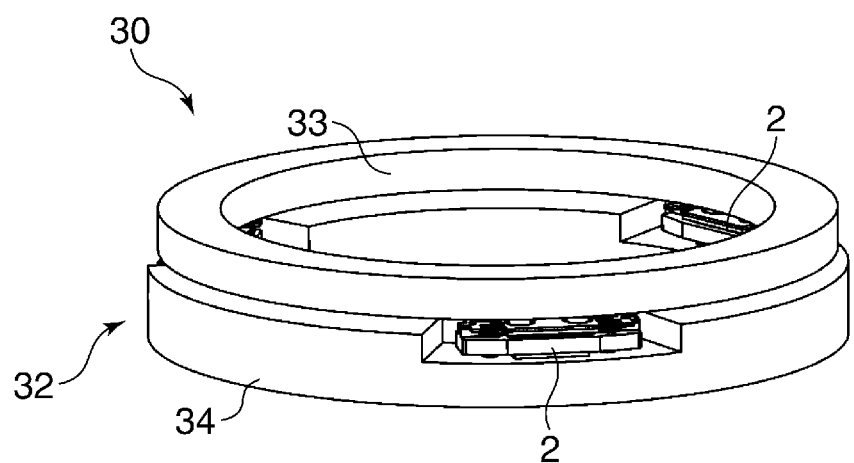
FIG. 9A is a perspective view showing an entire configuration of a rotary vibration actuator according an embodiment of the present invention.
Figure 9B:
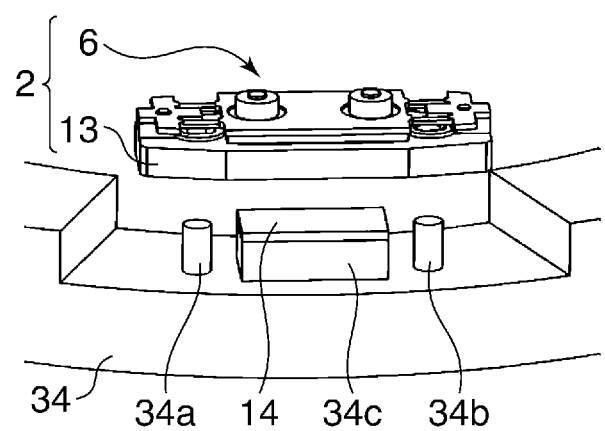
FIG. 9B is a partial exploded perspective view showing a holding mechanism of a vibration body unit that is a component of the rotary vibration actuator in FIG. 9A.

Next, a configuration of a rotary vibration actuator using the vibration body unit 2 mentioned above will be described. FIG. 9A is a perspective view showing the entire configuration of the rotary vibration actuator 30 using the vibration body unit 2. FIG. 9B is a partial exploded perspective view for describing a holding mechanism for the vibration body unit 2 in the vibration actuator 30.

The vibration actuator 30 is provided with a stator unit 32 and a rotor 33 as a driven body. The stator unit 32 has a circular base 34 and three vibration body units 2 held by the base 34. A first fitting projection 34a and a second fitting projection 34b that respectively constitute the first fitting part K1 and the second fitting part K2 are formed for each of the three vibration body units 2 on the base 34. Moreover, the base 34 is provided with a pressing table 34c equivalent to the pressurizing block 15. The shock absorber 14 that contacts with the vibration body 6 and gives pressure force is pasted on the upper surface of the pressing table 34c. The pressure force is given to the vibration body 6 by an elastic member (not shown) arranged at the bottom side of the stator unit 32 through the pressing table 34c and the shock absorber 14. In addition, the three vibration body units 2 give friction-driving forces in the tangential directions of the roller 33, respectively. Accordingly, when the three vibration body units 2 are driven so as to produce rotational force in the rotor 33, a relative rotation movement occurs between the stator unit 32 and the rotor 33.

The vibration actuator 30 is used for driving a lens of an image pickup apparatus (optical apparatus), for example. Accordingly, the image pickup apparatus that used the vibration actuator 30 for driving a lens arranged in a lens barrel will be described as an example.

Figure 10A:
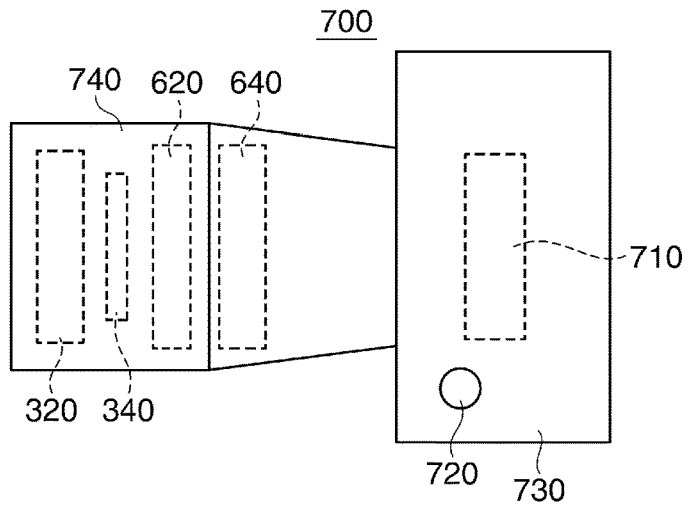
FIG. 10A is a top plan view schematically showing a configuration of an image pickup apparatus using the vibration actuator shown in FIG. 9A.

FIG. 10A is a top plan view schematically showing a configuration of the image pickup apparatus 700. The image pickup apparatus 700 is provided with a camera body 730 in which an image pickup device 710 and a power button 720 are mounted. Moreover, the image pickup apparatus 700 is provided with a lens barrel 740 that has a first lens group (not shown), a second lens group 320, a third lens group (not shown), a fourth lens group 340, and vibration driving devices 620 and 640. The lens barrel 740 is an interchangeable lens. The lens barrel 740 that is suitable to a photographing object can be attached to the camera body 730. In the image pickup apparatus 700, the second lens group 320 and the fourth lens group 340 are respectively driven by the two vibration driving devices 620 and 640.

Although the detailed configuration of the vibration driving device 620 is not shown, the vibration driving device 620 has the vibration actuator 30 and a drive circuit for the vibration actuator 30. The rotor 33 is arranged in the lens barrel 740 so that the radial direction intersects approximately perpendicularly with an optical axis. The vibration driving device 620 rotates the rotor 33 around the optical axis and moves the second lens group 320 in an optical axis direction by converting the rotation output of the driven body into a linear movement in the optical axis direction via gears (not shown) etc. The vibration driving device 640 moves the fourth lens group 340 in the optical axis direction using the same configuration as the vibration driving device 620.

Figure 10B:
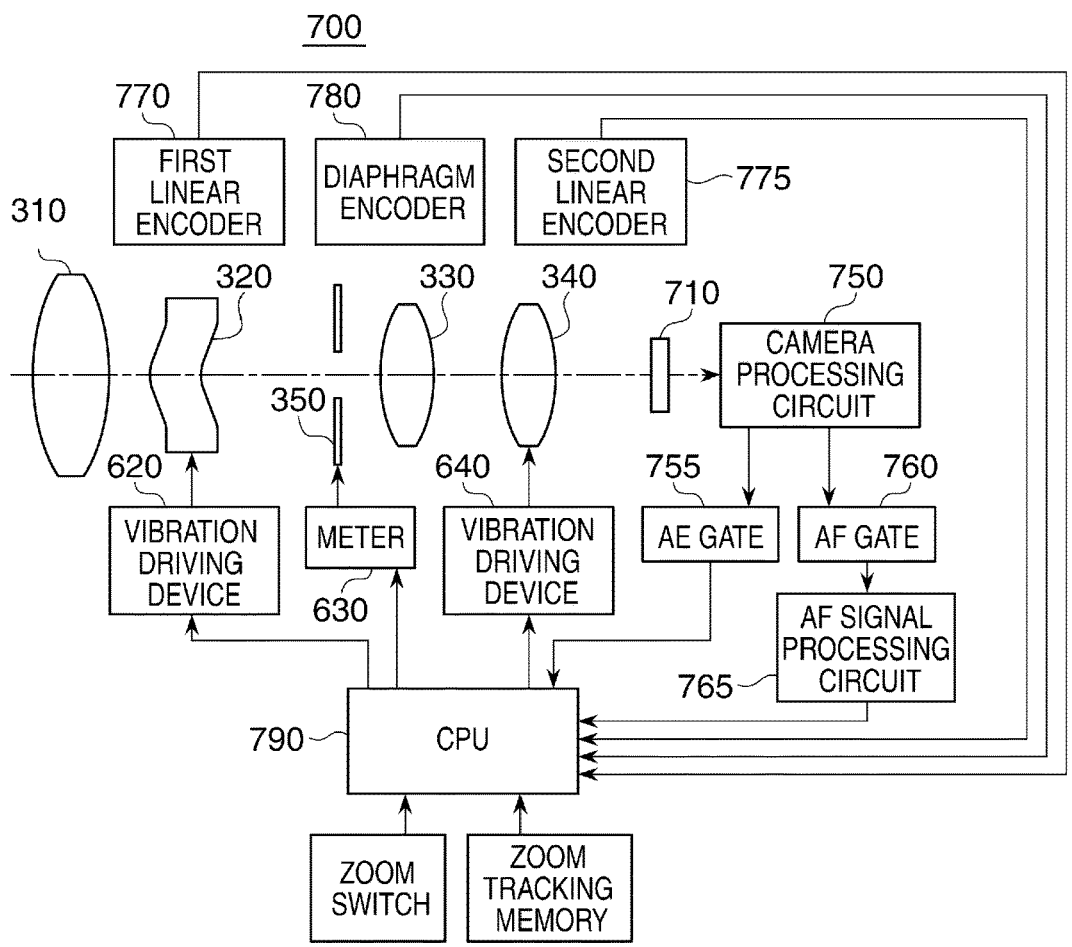
FIG. 10B is a block diagram schematically showing configurations of an optical system and a control system.

FIG. 10B is a block diagram schematically showing configurations of the optical system and a control system of the image pickup apparatus 700. The first lens group 310, second lens group 320, third lens group 330, fourth lens group 340, and light-amount adjustment unit 350 are arranged at the specified positions on the optical axis in the lens barrel 740. The light passing through the first, second, third, and fourth lens groups 310, 320, 330, and 340 and the light-amount adjustment unit 350 forms an image on the image pickup device 710. The image pickup device 710 converts an optical image into an electrical signal and outputs, and its output is sent to a camera processing circuit 750.

The camera processing circuit 750 applies amplification, gamma correction, etc. to the output signal from the image pickup device 710. The camera processing circuit 750 is connected to a CPU 790 via an AE gate 755 and is connected to the CPU 790 via an AE gate 755 and an AF signal processing circuit 765. A video signal to which the predetermined process was applied in the camera processing circuit 750 is sent to the CPU 790 via the AE gate 755, and via the AF gate 760 and the AF signal processing circuit 765. It should be noted that the AF signal processing circuit 765 extracts a high frequency component of the video signal, generates an evaluation value for autofocus (AF), and supplies the evaluation value to the CPU 790.

The CPU 790 is a control circuit that controls the entire operation of the image pickup apparatus 700, and generates control signals for determining exposure and focusing on the basis of the obtained video signal. The CPU 790 adjusts the positions of the second lens group 320, the fourth lens group 340, and the light-amount adjustment unit 350 in the optical axis direction by controlling the vibration driving devices 620 and 640 and a meter 630 so as to obtain the determined exposure and the suitable focusing state. Under the control by the CPU 790, the vibration driving device 620 moves the second lens group 320 in the optical axis direction, the vibration driving device 640 moves the fourth lens group 340 in the optical axis direction, and the meter 630 drives the light-amount adjustment unit 350.

The position of the second lens group 320 that is driven by the vibration driving device 620 in the optical axis direction is detected by a first linear encoder 770. The CPU 790 is notified of the detection result, and feeds back the detection result to the drive of the vibration driving device 620. Similarly, the position of the fourth lens group 340 that is driven by the vibration driving device 640 in the optical axis direction is detected by a second linear encoder 775. The CPU 790 is notified of the detection result, and feeds back the detection result to the drive of the vibration driving device 640. The position of the light-amount adjustment unit 350 in the optical axis direction is detected by a diaphragm encoder 780. The CPU 709 is notified of the detection result, and feeds back to the drive of the meter 630.

Figure 11A:
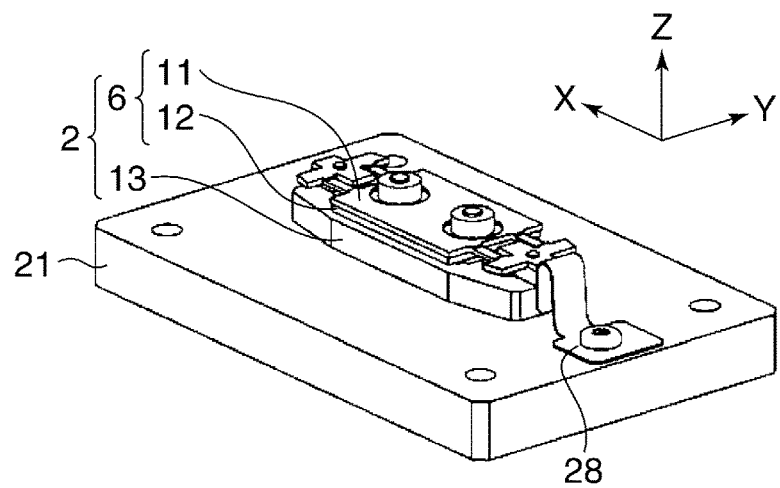
FIG. 11A is a perspective view showing another configuration for holding the vibration body unit in the vibration actuator in FIG. 1A.
Figure 11B:
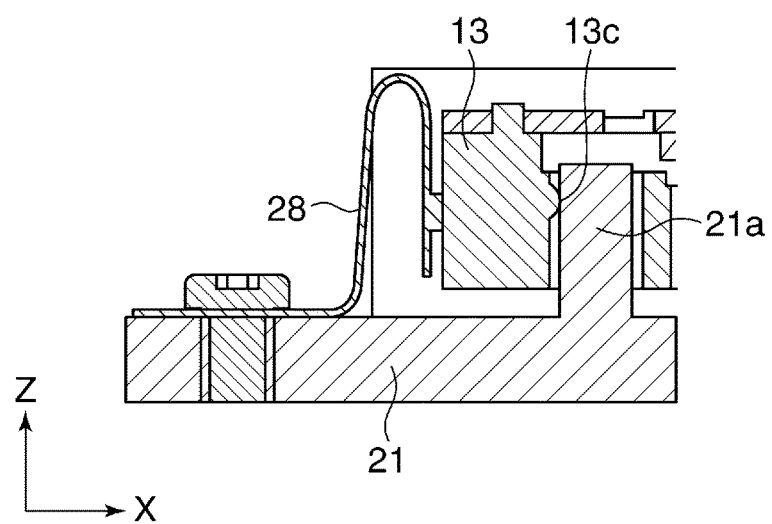
FIG. 11B is a partial sectional view showing the vibration body unit in FIG. 11A.

Next, another configuration for holding the vibration body unit 2 in the vibration actuator 1 will be described. FIG. 11A is a perspective view showing the other configuration for holding the vibration body unit 2 in the vibration actuator 1. FIG. 11B is a partial sectional view of the vibration body unit 2. It should be noted that FIG. 11A and FIG. 11B show vicinity of the vibration body unit 2, and the reference numerals shown in FIG. 1A, FIG. 1B, and FIG. 2 are assigned to the corresponding parts as-is.

An energization spring 28 made of a metal plate is fixed to the base 21 by screw clamp etc. at a position adjacent to one end (the side of the first fitting part K1) in the X-axis direction of the vibration body unit 2. The energization spring 28 comes into contact with one side surface of the holding member 13 in the X-axis direction and gives energization force to the holding member 13 in the X-axis direction. A convex part 13c is formed on only one side surface at which the energization spring 28 is arranged among the two side surfaces of the first fitting hole 13a in the X-axis direction in the first fitting part K1. Accordingly, the energization force given to the holding member 13 with the energization spring 28 makes the convex part 13c become contact with the first fitting projection 21a. When the energization force is larger than the driving force generated by the vibration body 6, the position of the vibration body unit 2 is kept constant in the X-axis direction because the contact state between the convex part 13c and the first fitting projection 21a is held. Thus, the driven body 4 is positioned with high accuracy during the operation of the vibration actuator 1.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although the first and second fitting projections 21a and 21b are provided in the base 21 and the first and second fitting holes 13a and 13b are formed in the holding member 13 in the vibration actuator 1, the projections may be provided in the holding member and the holes may be formed in the base. That is, the fitting projections are provided in one of the base 21 and the holding member 13, and the fitting holes are formed in the other. The concrete application example of the vibration actuator 1 is not limited to the image pickup apparatus described with reference to FIG. 10A and FIG. 10B, and is widely applicable to an electronic apparatus equipped with components that need movement by the vibration actuator 1.

This application claims the benefit of Japanese Patent Application No. 2016-087072, filed Apr. 25, 2016, which is hereby incorporated by reference herein in its entirety.

What is claimed is:

1. A vibration actuator comprising:
a vibration body that has an electro-mechanical energy conversion element;
a driven body that contacts with said vibration body in a first direction and that relatively moves with respect to said vibration body in a second direction that intersects perpendicularly with the first direction;
a holding member that holds said vibration body; and
a support member that supports said holding member,
wherein one of said holding member and said support member has two projections projected in the first direction, and the other has two holes into which the two projections are respectively fitted to form a first fitting part and a second fitting part, and
wherein the projection contacts with the hole at least one part in the second direction and in a third direction that intersects perpendicularly with both the first and second directions in the first fitting part, the projection contacts with the hole at least one part in the third direction in the second fitting part, and a contact range of the projection and the hole in the third direction in the first fitting part differs from that in the second fitting part.

2. The vibration actuator according to claim 1, wherein convex parts that contact with the projection at top portions thereof and that are short in the first direction and extend in the second direction are respectively formed on two side surfaces of the hole in the first fitting part in the third direction, and two side surfaces of the hole contact with the projection in the third direction in the second fitting part.

3. The vibration actuator according to claim 2, wherein convex parts that contact with the projection at top portions thereof and that are short in the first direction and extend in the third direction are respectively formed on two side surfaces of the hole in the first fitting part in the second direction.

4. The vibration actuator according to claim 1, wherein the projection that is cylindrical fits in the hole of which a plane shape is an approximate square when viewed in the first direction in the first fitting part, and the projection that is cylindrical fits in the hole of which a plane shape is an approximate rectangle of which a longer side meets the second direction when viewed in the first direction in the second fitting part.

5. The vibration actuator according to claim 1, wherein the projection that is cylindrical fits in the hole of which a plane shape is an approximate circle when viewed in the first direction in the first fitting part, and the projection that is cylindrical fits in the hole of which a plane shape is an approximate ellipse of which a longer side meets the second direction when viewed in the first direction in the second fitting part.

6. The vibration actuator according to claim 1, wherein the projection that is cylindrical fits in the hole of which a plane shape is an approximate circle when viewed in the first direction in the first fitting part, and the projection that is cylindrical fits in the hole of which a plane shape is an approximate oval of which a major axis meets the second direction when viewed in the first direction in the second fitting part, and
wherein a convex part that contacts with the projection at a top portion thereof and that is projected inwardly is formed on the hole of which the plane shape is the approximate circle at a center part in the first direction.

7. The vibration actuator according to claim 1, wherein the projection that is a square pole fits in the hole of which a plane shape is an approximate square when viewed in the first direction in the first fitting part, and the projection that is a square pole fits in the hole of which a plane shape is an approximate rectangle of which a longer side meets the second direction when viewed in the first direction in the second fitting part, and wherein convex parts that contact with the projection at top portions thereof and that are short in the second direction and extend in the third direction are respectively formed on two side surfaces of the hole in the first fitting part in the third direction, and dot-shaped convex parts that contact with the projection at top portions thereof are respectively formed on two side surfaces of the hole in the second fitting part in the third direction.

8. The vibration actuator according to claim 1, further comprising an energizing member that energizes said holding member with respect to said support member in the second direction.

9. An electrical apparatus comprising:
   a vibration actuator comprising:
      a vibration body that has an electro-mechanical energy conversion element;
      a driven body that contacts with said vibration body in a first direction and that relatively moves with respect to said vibration body in a second direction that intersects perpendicularly with the first direction;
      a holding member that holds said vibration body; and
      a support member that supports said holding member; and
   a member that is moved by said vibration actuator,
   wherein one of said holding member and said support member has two projections projected in the first direction, and the other has two holes into which the two projections are respectively fitted to form a first fitting part and a second fitting part, and
   wherein the projection contacts with the hole at least one part in the second direction and in a third direction that intersects perpendicularly with both the first and second directions in the first fitting part, the projection contacts with the hole at least one part in the third direction in the second fitting part, and a contact range of the projection and the hole in the third direction in the first fitting part differs from that in the second fitting part.

* * * * *